July 9, 1946.   P. W. FOSTER, JR   2,403,432
VAPOR GENERATING APPARATUS
Filed April 22, 1942   4 Sheets-Sheet 3
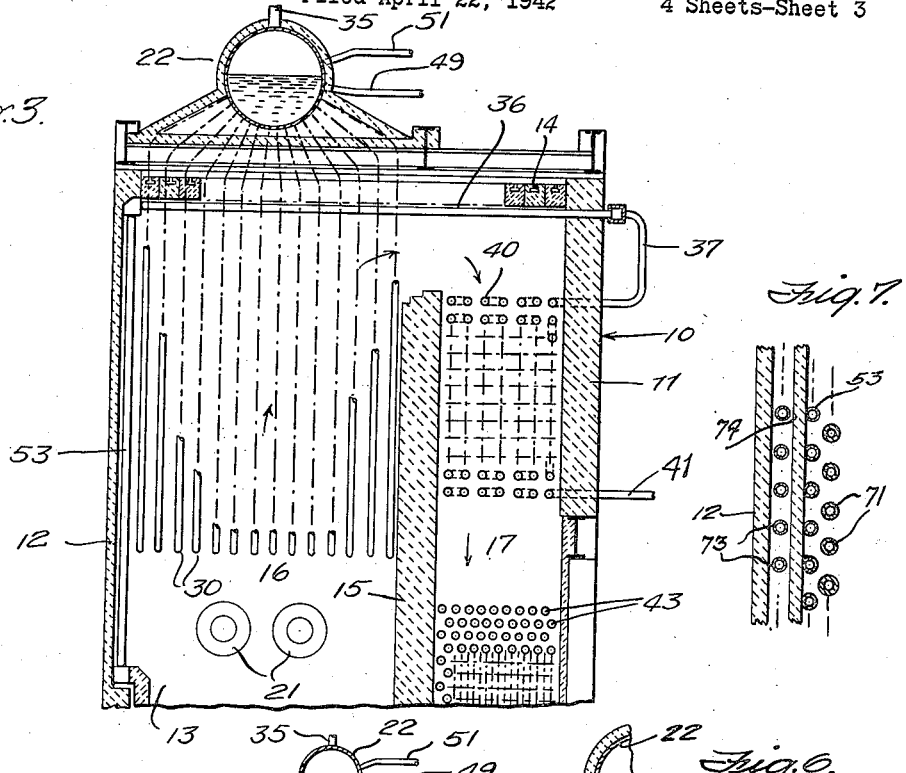
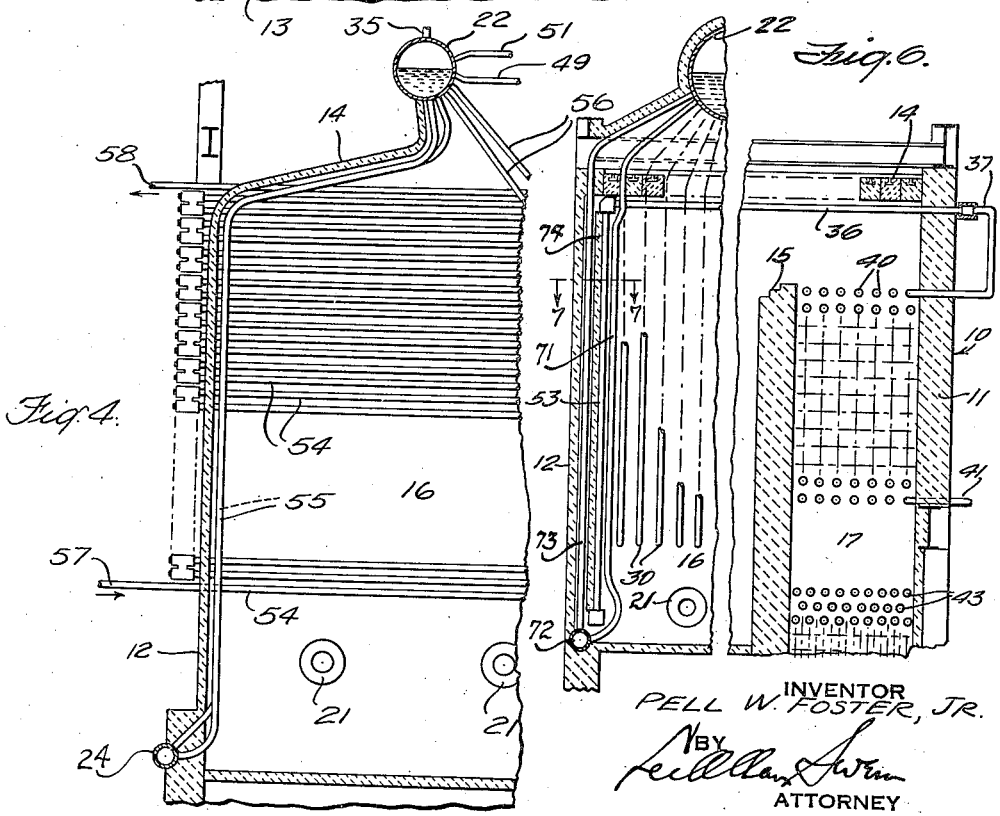
INVENTOR
PELL W. FOSTER, JR.
BY
ATTORNEY July 9, 1946.  P. W. FOSTER, JR  2,403,432
VAPOR GENERATING APPARATUS
Filed April 22, 1942  4 Sheets-Sheet 4

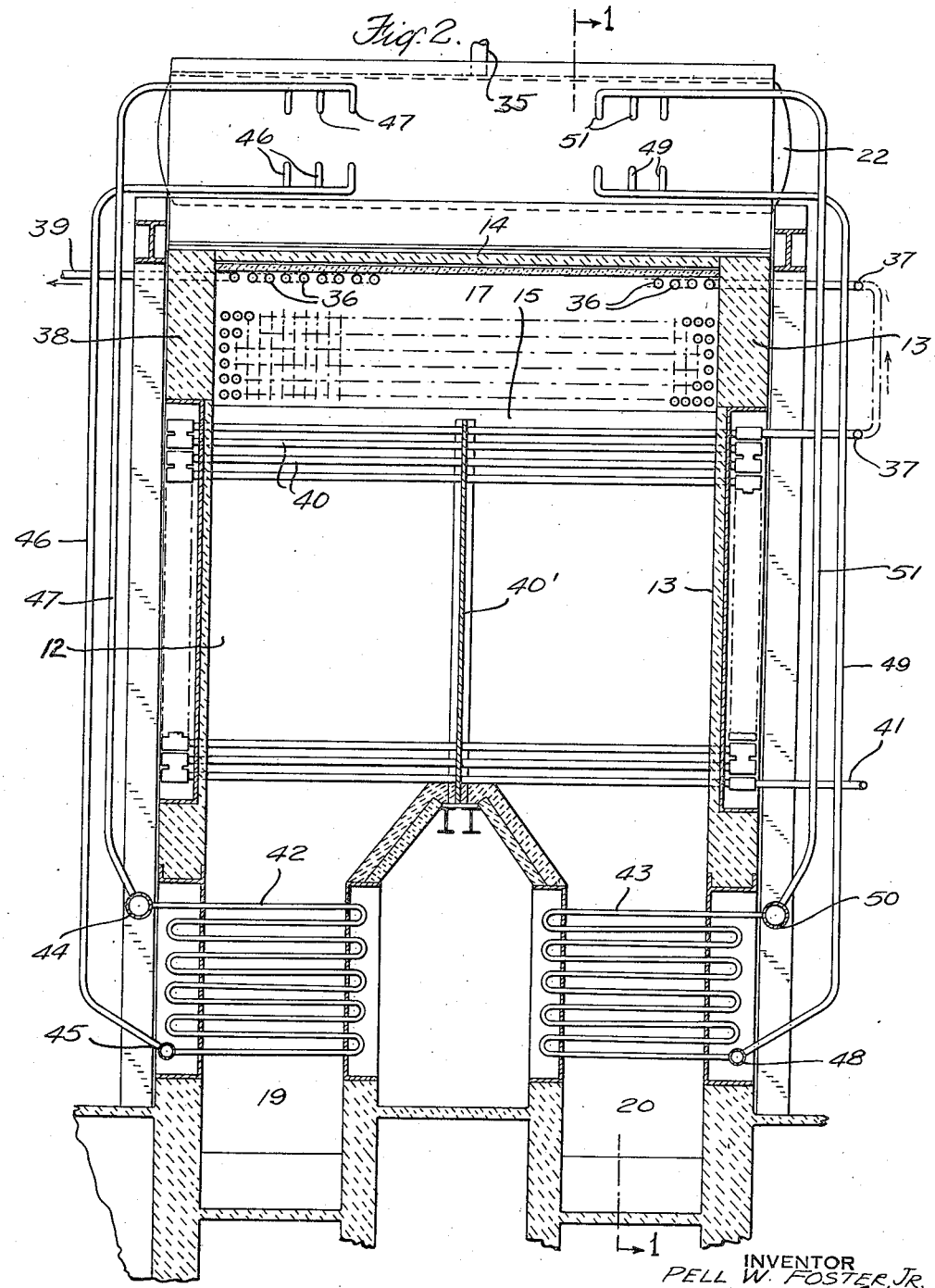

INVENTOR
PELL W. FOSTER, JR.
BY
ATTORNEY

Patented July 9, 1946

2,403,432

UNITED STATES PATENT OFFICE 2,403,432

VAPOR GENERATING APPARATUS

Pell W. Foster, Jr., Englewood, N. J., assignor to Foster Wheeler Corporation, New York, N. Y., a corporation of New York Application April 22, 1942, Serial No. 440,052

7 Claims. (Cl. 196—110)

This invention relates to heating, and more particularly to apparatus for the generation of vapor and heating of fluids.

In present methods of refining hydrocarbon oils, the oils are charged through a still to impart thereto the necessary heat to effect their fractionation or conversion, which usually comprises a plurality of tubular members through which the oil to be heated is passed, the members being disposed in a separately fired furnace. In fractionation, for example, oil heated in the still is passed through fractionating apparatus wherein the hydrocarbon oil mixtures are separated into fractions of relatively narrow boiling point ranges. It is necessary in present processes to provide steam for various steps of fractionation, for example to operate a distillation unit or to revaporize some of the fractions before passing them through other fractionating apparatus for separation into further fractions. The steam generating apparatus and the still are generally separate units and are separately fired.

The present invention provides apparatus in which the still and the steam generating apparatus receive heat from gases of combustion from the same furnace. This construction results in a highly efficient unit for heating oil and producing steam since the unit may be operated with a minimum amount of air for combustion and a consequent high efficiency without the danger of overheating the oil processed in the still and consequent breaking down of the oil which results in the production of undesirable substances. It is possible with the present invention to supply heat to the still at a rate which is within a maximum allowable limit without waste of heat since heat is absorbed by the steam generating tubes reducing the heat absorption in the still tubes and thereby keeping the temperature of the oil in the still tubes within the maximum limit. Localized overheating in any still tube is prevented by means of the present invention.

The present invention provides apparatus in which steam may be generated at a low or a high pressure and in which sufficient steam for the operation of a distillation unit is produced by means of heat produced in the still furnace which obviates the expense in the construction and operation of a separate steam unit.

The invention will be understood from the following description when considered in connection with the accompanying drawings forming a part thereof and in which:

Fig. 2 is a transverse vertical sectional view taken on the line 2—2 of Fig. 1;

Fig. 3 is a transverse vertical sectional view of a portion of apparatus embodying another form of the invention;

Fig. 4 is a transverse vertical sectional view of a part of apparatus of a further form of the invention;

Fig. 6 is a transverse vertical sectional view more or less diagrammatically showing apparatus embodying a further form of the invention, and Fig. 7 is a sectional view taken on the line 7—7 of Fig. 6.

Like characters of reference refer to like parts throughout the several views.

Figure 1:
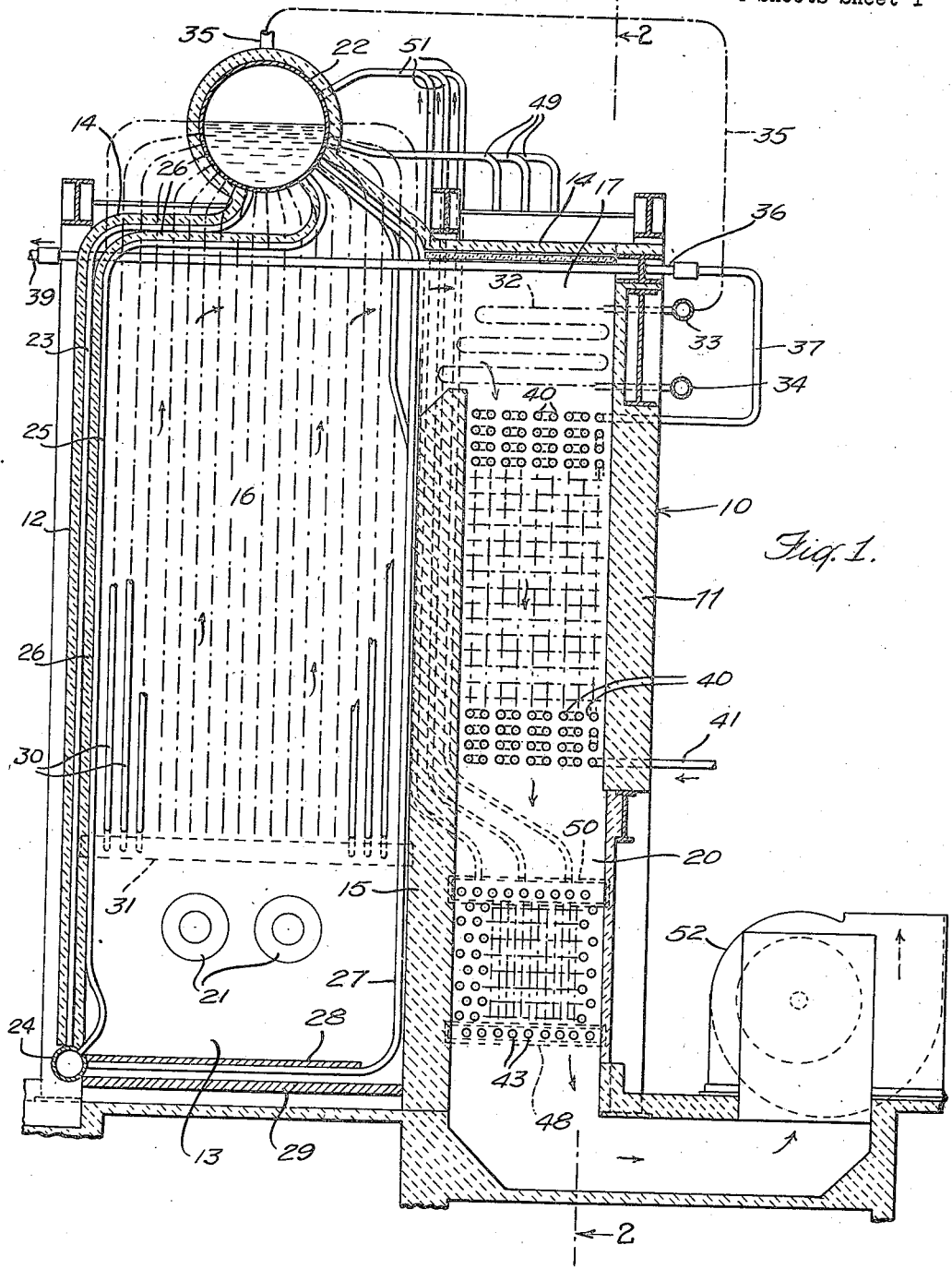
Fig. 1 is a transverse vertical sectional view taken on the line 1—1 of Fig. 2, showing more or less diagrammatically apparatus embodying one form of the invention.

Referring to Fig. 1, the reference numeral 10 designates a setting which includes vertical front and rear walls 12 and 11 respectively, a side wall 13, and a similar opposite side wall 38. A roof 14 extends across the top of the setting. A vertical partition 15 extends from the bottom of the setting to a point short of the roof thereof forming a furnace chamber 16 between the partition 15 and the front wall 12, and a gas passage 17 between the partition and the rear wall 11. Adjacent the bottom of the furnace chamber 16, the passage 17 is divided into two separate passages 19 and 20 as shown in Fig. 2. The furnace chamber 16 is fired by burners 21 positioned in the side wall 13 adjacent the bottom of the furnace chamber 16.

A horizontal steam and water drum 22 is positioned above the roof 14 and over the furnace chamber 16. A row of downcomer tubes 23 are disposed along the inner surface of wall 12. These tubes extend from the bottom portion of the drum 22 across a portion of the chamber 16 adjacent the roof 14 and thence vertically downwardly along the wall 12 to the header 24 adjacent the bottom of the chamber. A row of steam generating tubes 25 similar to the row of tubes 23 also extends from the lower portion of the drum 22 horizontally across a portion of the roof 14 in spaced relationship to the downcomers 23 thence vertically downwardly in spaced relationship to the tubes 23 to the header 24. The tubes 23 and 25 are separated by refractory material 26. The surface of the partition 15 toward the furnace chamber 16 is lined with a row of steam generating tubes 27 which extend from the lower portion of the drum 22 at an inclined angle along a portion of the roof 14 thence vertically downwardly along the partition 15 to the bottom of the furnace chamber. The tubes are then bent to extend horizontally across the bottom of the chamber 16 to the header 24. The portion of the tubes 27 extending across the bottom of the chamber are covered by a sheet 28 of refractory material and are spaced from a bottom 29 of the chamber 16. Alternate tubes 27 are bent inwardly toward the chamber 16 between the top of the partition 15 and roof 14 thereby forming a screen through which gases of combustion pass from the chamber 16 into the passage 17. The side wall 13 is lined by a plurality of steam generating tubes 30 which extend from the drum 22 vertically downwardly along said wall to a point short of the burners 21 at which point the tubes are connected to a header 31. Tubes 30 form a row extending between the wall 12 and partition 15, said tubes being horizontally spaced.

A bank of superheater tubes 32 is positioned at the top of the passage 17 adjacent the roof 14 of the setting. The tubes extend transversely of said passage and as shown, the bank comprises a plurality of horizontally spaced tubes each tube being reversely bent to form a vertical row of superimposed passes for vapor. Each tube extends from an inlet header 33 downwardly to an outlet header 34. The inlet header 33 is connected to the steam and water drum 22 by means of a conduit 35.

A row of still tubes 36 is disposed adjacent the roof 14 of the setting 10 substantially out of the path of gases flowing from the chamber 16 into the passage 17. The tubes extend horizontally between the walls 11 and 12 and are positioned side by side in spaced relationship to form a row of tubes between the side walls 13 and 38. The tubes 36 are serially connected and, as shown, oil to be treated enters the row through a conduit 37 connected to the tube 36 nearest the side wall 13 and passes serially through the tubes to an outlet 39 connected to the tube 36 nearest the wall 38.

A bank of still tubes 40 is arranged in the passage 17 beneath the superheater tubes. The tubes 40 extend horizontally between the side wall 13 and the opposite side wall 38 the tubes being supported at their opposite ends by said walls. The tubes 40 are arranged in vertically and horizontally spaced rows, the tubes of each horizontal row being serially connected. Each horizontal row of tubes is serially connected with the next adjacent horizontal row. The bank of tubes 40 is connected to the still tubes 36 by means of the conduit 37. Oil is fed to the bottom row of tubes 37 through a conduit 41. The tubes 40 are supported intermediate their opposite ends by a tube plate 40'. Banks of waste heat boiler tubes 42 and 43 are respectively positioned in passages 19 and 20. The tubes 42 extend substantially horizontally across the passage 19, between the wall 38 and the wall of the passage 19 opposite thereto and comprise a plurality of horizontally spaced tubes each tube being reversely bent to form a vertical row of spaced superimposed passes. The opposite ends of the tubes 42 are respectively supported by the side wall 38 and the wall of the passage 19 opposite thereto. Tubes 42 are connected at one end to an outlet header 44 and at the opposite end to an inlet header 45. The inlet header 45 is connected to the steam and water drum 22 by means of conduits 46 while the outlet header 44 is connected to the upper portion of steam and water drum 22 through conduits 47. The waste heat boiler tubes 43 are disposed in the passage 20 in the same manner as tubes 42 are positioned in the passage 19. The bottom of the bank of tubes 43 is connected to an inlet header 48, which header is in communication with the bottom portion of the drum 22 through conduits 49 while the top of the bank of tubes 43 is connected to an outlet header 50 which is in turn connected to the upper portion of the drum 22 by means of conduits 51. Gases of combustion are withdrawn from the passage 17 and passages 19 and 20 and discharged into a flue, not shown, by means of the fan 52.

In operation, water from the drum 22 flows downwardly through the downcomer tubes 23 along the wall 12 of the setting into the header 24. Upon firing the furnace chamber 16 by means of the burners 21, steam is generated in the tubes 25 adjacent the wall 12 and tubes 27 along the partition 15 and the bottom of the chamber 16, the steam rising through said tubes into the drum 22. Gases of combustion flowing upwardly through the chamber 16 generate steam in the tubes 30, which steam passes upwardly into the drum 22. The still tubes 36 adjacent the roof of the chamber 16 absorb heat from the gases of combustion in the chamber 16 and also from said gases as they flow through the opening between the top of the partition and the roof 14 into the passage 17. Sufficient heat is absorbed from the gases of combustion by the tubes 25, 27 and 30 to reduce the temperature thereof so that there will be no danger of overheating the oil flowing through the tubes 36. The gases of combustion from the chamber 16 pass downwardly in the passage 17, first passing over the superheater tubes 32 and thence over the bank of still tubes 40. Since oil to be heated enters the tubes 40 at the bottom of the bank thereof, the flow of gases over the bank is countercurrent to the flow of oil through the tubes. Heated oil from the tubes 40 passes into the tubes 36 through the conduit 37. Placing of the superheater ahead of the bank of still tubes 40 in respect to the flow of gases obviates the danger of overheating the oil flowing through the tubes 40. After passing over the tubes 40, gases of combustion flow from the passage 17 into the passages 19 and 20 and thence over the tubes 42 and 43 in said passages respectively thereby generating steam in said tubes. Steam generated in the tubes 43 passes into the header 50, thence through the conduits 51 into the drum 22, while steam generated in the tubes 42 passes into the header 44 and flows through the conduits 47 into the drum 22. Steam in the drum 22 passes through the conduit 35 and inlet header 33 into superheater tubes 32 where it is superheated and passed to a point of use through the outlet header 34.

In the form of the invention shown in Fig. 3, a row of vertically extending still tubes 53 is disposed along the wall 12 of the chamber 16. The ends of the tubes 36 adjacent the wall 11 are serially connected while the opposite ends of the tubes are connected to the upper ends of the tubes 53. The lower ends of the tubes 53 are serially connected. Oil to be heated will, therefore, enter one of the tubes 36, flow horizontally therethrough into one of the tubes 53 thence downwardly in said tube to the bottom thereof whence it flows to the next tube 53. From the said next tube 53, the oil flows back to the tube 36 connected thereto whence it passes serially through the other tubes 36 and 53. In this form of the invention, all steam generating tubes are omitted from the walls of the furnace chamber 16 with the exception of the tubes 30 adjacent the wall 13 in which tubes steam is generated. In other respects, the operation of this form of the invention is similar to that of the form shown in Figs. 1 and 2.

In the form of the invention shown in Fig. 4, a group of serially connected, horizontally extending still tubes 54 are disposed on the wall 13 of the chamber 16, while a group of steam generating tubes 55 extend along the wall 12 and roof 14 to the steam and water drum 22. A row of tubes 56 extends along the surface of the partition 15, not shown in this view, on the side of the partition toward the chamber 16. In this form of the invention, oil to be heated enters the tubes 54 at 57 and flows serially through said tubes from which the heated oil passes at 58. If desired, the oil may be preheated in a convection heated section of tubes such as the tubes 40 shown in Fig. 1.

Figure 5:
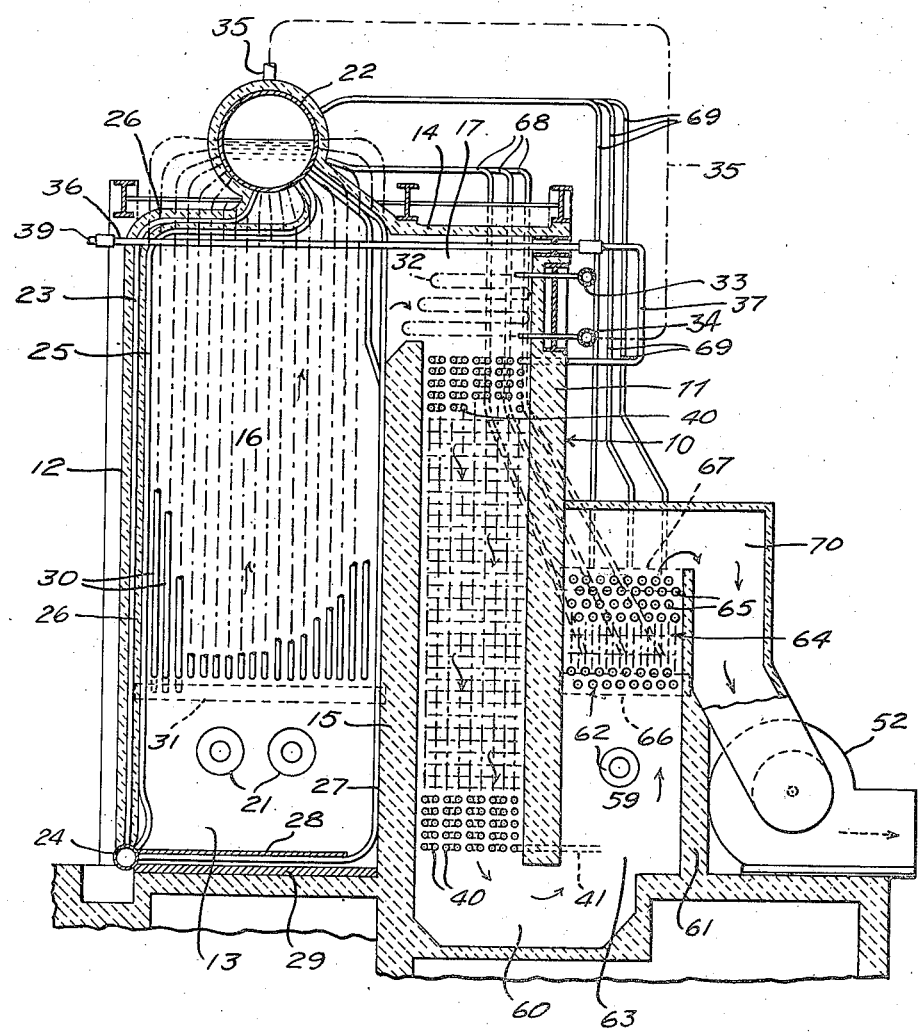
Fig. 5 is a transverse vertical sectional view showing more or less diagrammatically apparatus embodying another form of the invention.

As shown in Fig. 5, the waste heat boiler may be heated by gases of combustion from an auxiliary furnace. In the form of the invention shown in Fig. 5, the passage 17 is extended to a point adjacent the bottom of the furnace chamber 16 and is in communication at the bottom thereof with the bottom of a furnace chamber 59 through a passage 60. The front of the chamber 59 is formed by the wall 11, while the rear is formed by a wall 61. The chamber is fired by a burner 62 positioned in one side wall 63 of the chamber. A bank 64 of horizontally extending steam generating tubes 65 is positioned in the chamber 59 above the burner 62. The bottom of the bank of tubes is connected to an inlet header 66 while the top of the bank is connected to an outlet header 67. The inlet header 66 is in communication with the bottom of the drum 22 through conduits 68 while the outlet header 67 is connected with the upper portion of the drum by the conduits 69. The chamber 59 is in communication with the fan 52 through a passage 70. In other respects, the construction and arrangement of the apparatus shown in Fig. 5 is similar to the form of the invention shown in Fig. 1.

In the operation of the form of the invention shown in Fig. 5, gases of combustion passing from the passage 17 flow into the chamber 59, through the passage 60 where these gases mix with the gases of combustion in the chamber 59, whence said mixture of gases are drawn over the group 64 of waste heat boiler tubes 65 and through the passage 70 by the fan 52 which discharges the gases into a flue. With the apparatus of this form of the invention, steam may be generated in the apparatus independently of the furnace 16 by firing the burner 62.

In the form of the invention shown in Fig. 6, a row of spaced vertically extending still tubes 53 is disposed along the wall 12 of the chamber 16 in the same manner as in the apparatus shown in Fig. 3. Also, as in the form of the invention shown in Fig. 3, the ends of the tubes 36 are serially connected while the opposite ends of the tubes are connected to the upper ends of the tubes 53. The lower ends of the tubes 53 are serially connected. The flow of oil to be heated in the tubes 53 and 36 is the same in the form of the invention shown in Fig. 3 hereinbefore described. The tubes 53, in the form of the invention shown in Fig. 6, are screened by a row of spaced water wall tubes 71 spaced inwardly from the tubes 53 between said tubes and the burners 21. The tubes 71 are positioned adjacent the spaces between the tubes 53 so that each tube 71 shades the tubes 53 on opposite sides of said tube from gases of combustion from the burners 21, as shown in Fig. 7. The water wall tubes 71 are connected into the circulation system of the heater in the same manner as the tubes 25 in the form of the invention shown in Fig. 1 of the drawings. At their upper ends, the tubes 71 are connected to the steam and water drum 22 and at their lower ends are connected to a header 72. Downcomer tubes 73 separated from the oil tubes 53 by means of the refractory material 74, are connected to the lower portion of the steam and water drum at their upper ends and to the header 72 at their lower ends. With the use of a row of tubes 71 to screen the still tubes 53 from radiant heat of the gases of combustion from the burners 21, the heat absorption rate of the oil heating tubes is decreased thereby obviating the possibility of overheating the oil therein. An increased firing rate to increase the rate of steam generation in the heater may be used in the chamber 16 without damage to the oil in the still tubes. It will be understood that the particular location and arrangement of the row of screen tubes 71 may be varied in accordance with the amount of heat to be absorbed thereby to maintain the amount of heat absorption of the tubes 53 within a maximum safe allowable limit so that the oil therein will not be overheated.

The use in a furnace of steam generating surface together with tubes through which oil to be heated is passed provides apparatus in which high efficiency is obtained without danger of overheating the oil since a minimum amount of air for combustion is required. The still tubes will not be overheated due to the absorption of heat by the steam generating surface. Absorption of heat by the steam generating surface controls the temperature of the gases of combustion so that it is not necessary to reduce the temperature thereof before the gases pass over the convection heated still tubes by introduction of air or the recirculation of flue gases. With apparatus including oil heating and also steam generating surface in one furnace, sufficient steam is produced in one unit for the operation of a distillation unit without the necessity of a separate steam generating unit resulting in a saving of the cost of construction and operation of a separate steam generating unit. Positioning steam generating tubes and still tubes in the same furnace and placing additional still tubes and water heating tubes in a position to recover waste heat from the gases of combustion results in an overall fuel efficiency of the furnace.

Although the invention has been disclosed as embodied in apparatus for heating petroleum and generating steam, the invention is applicable to the heating of various types of oil and the generation of other forms of vapor. It is to be understood that changes may be made in the form, location and relative arrangement of parts of the apparatus shown and described herein, without departing from the principles of the invention, which is not to be limited excepting by the scope of the appended claims.

What is claimed is:

1. Vapor generating apparatus comprising a setting having enclosing walls including substantially vertically extending side walls, a substantially horizontally extending roof and a bottom, a vapor and liquid drum disposed above the roof, a partition extending substantially vertically in the setting between the side walls to a point short of the roof dividing said setting into a heating chamber and a heat absorbing chamber, means in the lower portion of the heating chamber for producing a stream of products of combustion for flow through the heating chamber and thence through the heat absorbing chamber, a vapor generating section in the heating chamber comprising a row of spaced tubes extending substantially vertically along at least one side wall of the chamber, another row of spaced tubes extending substantially vertically adjacent the heating chamber side of the first-mentioned row of tubes and in spaced relationship to said side wall and the first-mentioned row of tubes, the first-mentioned row of tubes and said other row of tubes being connected in circulation with the drum, tubular members in the heat absorbing chamber, said tubular members being in communication with a source of oil supply, and other tubular members extending substantially horizontally across the top of the chambers closely adjacent the roof and along said at least one side wall of the heating chamber in the space between the first-mentioned row and said other row of spaced tubes and in radiant heat absorbing relationship to the products of combustion flowing through the chamber, said other tubular members being connected with said first-mentioned tubular members, the other tubular members extending along said side wall being disposed opposite the spaces between the tubes of said other row of tubes, the tubes of said other row of tubes being so arranged as to partially shade the other tubular members along said side wall from the stream of products of combustion and thereby reduce the heat absorption rate of said members.

2. Vapor generating apparatus comprising a setting having enclosing walls including substantially vertically extending side walls, a substantially horizontally extending roof and a bottom, a vapor and liquid drum disposed above the roof, a partition extending substantially vertically in the setting between the side walls to a point short of the roof dividing said setting into a heating chamber and a heat absorbing chamber, means in the lower portion of the heating chamber for producing a stream of products of combustion for flow through the heating chamber and thence through the heat absorbing chamber, a vapor generating section in the heating chamber comprising a plurality of downcomer tubes extending substantially vertically along at least one side wall of the chamber, spaced upcomer tubes extending substantially vertically adjacent said one side wall and in spaced relationship to the downcomer tubes, said upcomer and downcomer tubes being connected to the drum at the upper portion thereof and connected together at the lower portion thereof, tubular members in the heat absorbing chamber, said tubular members being in communication with a source of oil supply, and other tubular members extending substantially horizontally across the top of the chambers closely adjacent the roof and along said at least one side wall of the heating chamber in the space between the upcomer and downcomer tubes and in radiant heat absorbing relationship to the products of combustion flowing through the chamber, said other tubular members being connected with said first-mentioned tubular members, the other tubular members extending along said side wall being disposed opposite the spaces between the upcomer tubes, the upcomer tubes being so arranged as to partially shade the other tubular members along said side wall from the stream of products of combustion and thereby reduce the heat absorption rate of said members.

3. Vapor generating apparatus comprising a setting having enclosing walls including substantially vertically extending side walls, a substantially horizontally extending roof and a bottom, a vapor and liquid drum disposed above the roof, a partition extending substantially vertically in the setting between the side walls to a point short of the roof dividing said setting into a heating chamber and a heat absorbing chamber, means in the lower portion of the heating chamber for producing a stream of products of combustion for flow through the heating chamber and thence through the heat absorbing chamber, a vapor generating section in the heating chamber comprising a plurality of downcomer tubes extending substantially vertically along the chamber side of at least one side wall of the chamber, spaced upcomer tubes extending substantially vertically adjacent said one side wall and in spaced relationship to the downcomer tubes, said upcomer and downcomer tubes being connected to the drum at the upper portion thereof and connected together at the lower portion thereof, tubular members in the heat absorbing chamber, said tubular members being in communication with a source of oil supply, other tubular members extending substantially horizontally across the top of the chambers closely adjacent the roof and along said at least one side wall of the heating chamber in the space between the upcomer and downcomer tubes and in radiant heat absorbing relationship to the products of combustion flowing through the chamber, said other tubular members being connected with said first-mentioned tubular members, the other tubular members extending along said side wall being disposed opposite the spaces between the upcomer tubes, the upcomer tubes being so arranged as to partially shade the other tubular members along said side wall from the stream of products of combustion and thereby reduce the heat absorption rate of said members, and a baffle wall positioned between the other tubular members extending along said one wall and the downcomer tubes.

4. Vapor generating apparatus comprising a setting having enclosing walls including side walls, a roof and a bottom, a vapor and liquid drum disposed above the roof, a partition extending from the bottom of the furnace to a point short of the roof dividing said setting into a heating chamber and a heat absorbing chamber, means in the lower portion of the heating chamber for producing a stream of products of combustion for flow through the heating chamber and thence through the heat absorbing chamber, a vapor generating section in the heating chamber comprising a plurality of downcomer tubes extending along at least one side wall of the chamber, spaced upcomer tubes extending adjacent said one side wall and in spaced relationship to the downcomer tubes, said upcomer and downcomer tubes being connected to the drum at the upper portion thereof and in communication with each other at the lower portion thereof, tubular members in the heat absorbing chamber, said tubular members being in communication with a source of oil supply, and other tubular members extending across the top of the chambers closely adjacent the roof and along said at least one side wall of the heating chamber in the space between the upcomer and downcomer tubes and in radiant heat absorbing relationship to the products of combustion flowing through the chamber, said other tubular members being connected with said first-mentioned tubular members, the other tubular members extending along said side wall being disposed opposite the spaces between the upcomer tubes, the upcomer tubes being so arranged as to partially shade the other tubular members along said side wall from the stream of products of combustion and thereby reduce the heat absorption rate of said members.

5. Vapor generating apparatus comprising a setting having enclosing walls including side walls, a roof and a bottom, a vapor and liquid drum disposed above the roof, a partition extending from the bottom of the furnace to a point short of the roof dividing said setting into a heating chamber and a heat absorbing chamber, means in the lower portion of the heating chamber for producing a stream of products of combustion for flow through the heating chamber and thence through the heat absorbing chamber, a vapor generating section in the heating chamber comprising a row of spaced tubes extending along at least one side wall of the chamber, another row of spaced tubes extending adjacent the heating chamber side of said first-mentioned row of tubes and in spaced relationship to said side wall and the first-mentioned row of tubes, the first-mentioned row of tubes and said other row of tubes being connected in circulation with said drum, tubular members in the heat absorbing chamber, said tubular members being in communication with a source of oil supply, and other tubular members extending across the top of the chambers closely adjacent the roof and along said at least one side wall of the heating chamber in the space between the first-mentioned row and said other row of spaced tubes and in radiant heat absorbing relationship to the products of combustion flowing through the chamber, said other tubular members being connected with said first-mentioned tubular members, the other tubular members extending along said side wall being disposed opposite the spaces between the tubes of said other row of tubes, the tubes of said other row of tubes being so arranged as to partially shade the other tubular members along said side wall from the stream of products of combustion and thereby reduce the heat absorption rate of said members.

6. Vapor generating apparatus comprising a setting having enclosing walls forming a furnace chamber, a vapor and liquid drum in the setting, means for firing said chamber, a vapor generating section in the chamber comprising a row of spaced tubes extending along at least one side wall of the chamber, another row of spaced tubes extending adjacent the chamber side of said first-mentioned row of tubes and in spaced relationship to said side wall and the first-mentioned row of tubes, the first-mentioned row of tubes and said other row of tubes being connected in circulation with said drum, a row of tubular members in communication with a source of oil supply and disposed along said at least one side wall of the chamber in the space between the first-mentioned and said other row of spaced tubes and in radiant heat absorbing relationship to the products of combustion from said firing means, the tubular members extending along said side wall being disposed opposite the spaces between the tubes of said other row of tubes, the tubes of said other row of tubes being so arranged as to partially shade the tubular members along said side wall from the stream of products of combustion and thereby reduce the heat absorption rate of said members.

7. Vapor generating apparatus comprising a setting having enclosing walls including substantially vertically extending side walls, a vapor and liquid drum in the setting, means for firing the chamber, a vapor generator in the heating chamber comprising a plurality of downcomer tubes extending substantially vertically along at least one side wall of the chamber, spaced upcomer tubes extending substantially vertically adjacent said one side wall and in spaced relationship to the downcomer tubes, said upcomer and downcomer tubes being connected to the drum at the upper portion thereof and connected together at the lower portion thereof, a row of substantially vertically extending tubular members in communication with a source of oil supply and disposed along said at least one side wall of the chamber in the space between the downcomer and upcomer tubes and in radiant heat absorbing relationship to the products of combustion flowing through the chamber, the tubular members extending along said side wall being disposed opposite the spaces between the upcomer tubes, the upcomer tubes being so arranged as to partially shade the tubular members along said side wall from the stream of products of combustion and thereby reduce the heat absorption rate of said members, and a baffle wall positioned between the tubular members extending along said one wall and the downcomer tubes.

PELL W. FOSTER, Jr.